United States Patent [19]
Gold et al.

[11] Patent Number: 5,612,615
[45] Date of Patent: *Mar. 18, 1997

[54] CRYOGENIC ELECTRONICS POWER SUPPLY

[75] Inventors: Calman Gold, Londonderry, N.H.; Carl J. Russo, Westlake, Ohio

[73] Assignee: American Superconductor Corporation, Westborough, Mass.

[ * ] Notice: The term of this patent shall not extend beyond the expiration date of Pat. No. 5,347,168.

[21] Appl. No.: 384,780

[22] Filed: Feb. 6, 1995

Related U.S. Application Data

[63] Continuation-in-part of Ser. No. 302,354, Sep. 7, 1994, abandoned, which is a continuation of Ser. No. 934,036, Aug. 21, 1992, Pat. No. 5,347,168.

[51] Int. Cl.$^6$ ........................................ H01F 36/00
[52] U.S. Cl. ..................... 323/360; 363/141; 327/366
[58] Field of Search ................. 323/360; 363/141; 327/366; 333/99 S; 505/210, 701, 866

[56] References Cited

U.S. PATENT DOCUMENTS

| | | | |
|---|---|---|---|
| 3,479,569 | 11/1969 | Prost et al. | 317/123 |
| 3,479,576 | 11/1969 | Satterthwaite et al. | 321/8 |
| 4,472,727 | 9/1984 | Tewksbury | 357/23.1 |
| 4,962,354 | 10/1990 | Visser et al. | 323/360 |
| 5,010,255 | 4/1991 | Hilal et al. | 307/106 |
| 5,087,610 | 2/1992 | Hed | 505/1 |
| 5,099,152 | 3/1992 | Suzuki | 307/476 |
| 5,118,660 | 6/1992 | Riebman | 505/1 |
| 5,146,383 | 9/1992 | Logan | 361/19 |
| 5,347,168 | 9/1994 | Russo | 307/245 |

*Primary Examiner*—Stuart N. Hecker
*Attorney, Agent, or Firm*—Fish & Richardson P.C.

[57] ABSTRACT

A cryogenically cooled circuit, operating at temperatures at which inductors windings of the circuit exhibit superconducting characteristics, provides unique advantages in high performance, preferably high power circuits. Portions of the circuit (or the entire circuit), as opposed to, for example only the superconducting elements (i.e., inductor winding), are refrigerated to cryogenic temperatures. Advantages in the characteristics of not only the superconducting based components but also the diodes, and gating elements such as MOSFET's, yield a uniquely advantageous circuit enabling the operation of, for example, a switching power supplies, frequency converters, and motor speed controllers with increased performance and efficiency. Size, component count, and stability are benefits attained by cryogenically cooling the entire circuit configuration. Cryogenically-cooled solid-state contacting switches may be utilized for connecting/disconnecting AC and/or DC power between the high performance circuit and a source/load.

21 Claims, 4 Drawing Sheets

CRYOGENIC ELECTRONICS POWER SUPPLY

CROSS REFERENCE TO RELATED APPLICATIONS

This application is a continuation-in-part of application Ser. No. 08/302,354 filed Sep. 7, 1994, now abandoned, which is a continuation of application Ser. No. 07/934,036 filed Aug. 21, 1992 which issued as U.S. Pat. No. 5,347,168 hereby incorporated by reference.

FIELD OF THE INVENTION

The invention relates generally to large capacity power supply, amplifier, and motor controller methods and apparatus and in particular to large capacity, reduced size supply methods and apparatus employing cryogenic cooling.

BACKGROUND OF THE INVENTION

Both before and since the advent of high temperature superconductors, many investigators have analyzed and experimented to determine the operating characteristics of circuit components at low temperatures. In particular, the operation of MOSFET's, superconducting inductors, and cryocooled capacitors have been examined and thermal models have been developed for these components. For example, power MOSFET's have been operated at temperatures of 77° K., and, significant advantages have been noted, such as a reduction of the on-resistance of the MOSFET's by as much as a factor of 30, at 77° K. Nevertheless, researchers have not considered the advantages of cryogenically cooled components operating together in a circuit configuration, for example, because of the refrigeration cost associated with cryogenically cooled electronics. However, cryocooled electronics have been considered for enhanced noise performance of amplifiers, and to speed up computer circuitry.

As will be described in more detail below, one particularly advantageous use of cryogenically cooled electronics is in high power, switching, power supplies. To understand those advantages in more detail, however, a brief discussion of the limitations of such power supplies operating at room temperature needs to be considered. Switch mode amplifiers, regulated power supplies, and frequency converters became a reality with the introduction of high speed power silicon devices. The main advantages of these switch mode applications is that, at least for ideal devices, the only losses involved are the saturation losses of the power devices in the forward direction. These losses are very low compared to the losses sustained in linear regulation or amplification devices; and these low losses have allowed the physical size of regulated power supplies to be reduced considerably.

For example, a linearly-regulated, three voltage, 200 watt power supply was typically over a cubic foot in volume, contained a heavy and expensive power transformer with its associated filtering components, and required approximately 200 watts of dissipation capacity in the active devices. In the newer switch mode versions of these 200 watt power supplies, which appear in nearly every personal computer, the volume of the supply has been reduced between ten and fifteen times, with comparable reductions in weight, power requirements, and cost.

In accordance with the prior art, the typical method used to obtain these size reductions has been to replace conventional power frequency components with significantly smaller filter and active components which operate at 300 to 30,000 times the frequency of the older power supplies. The power-speed product of the active devices, and the thermal limitations of the filter components, has slowed progress in the design of these switching mode devices. The most common power supply sizes range from a few watts (20–800 KHz) through a few kilowatts (18–35 KHz) to the less common 5–50 KW (5–20 KHZ). While very large single module amplifiers and supplies have been built (50 KW (5–20 KHz)), they are rare.

There are very few switching mode power supply designs which operate above these speed-power levels, unless the design is based on integrating multiple small modules, or using multiple active devices at lower frequencies with multiple passive components of smaller rating to limit the thermal problems. In general, the component losses scale at least linearly with the frequency of operation, therefore, very high power density designs, operating at high frequency, are limited to a low power output or use aggressive cooling strategies. These losses are often dominated by the switching losses in the power devices.

Figure 1:
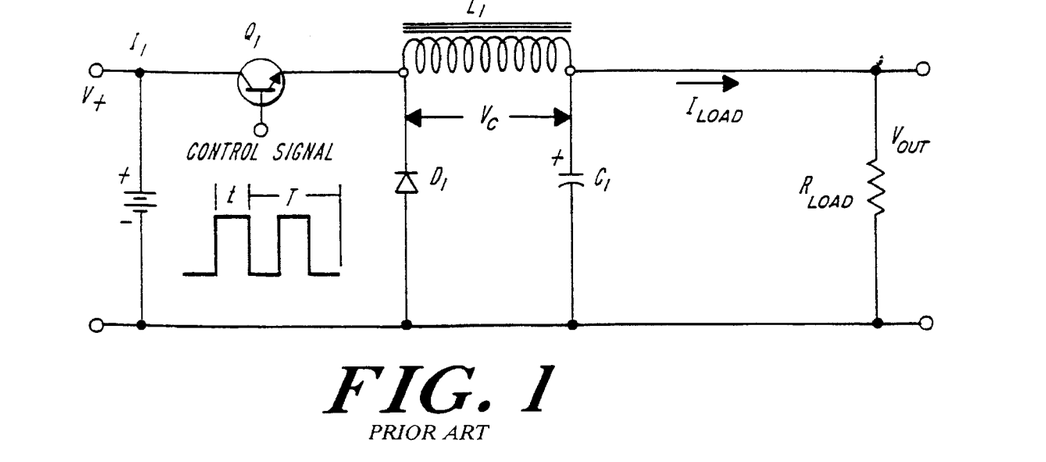
FIG. 1 is a circuit diagram of a simple switching mode power supply circuit known as a Buck converter.
Figure 2A:
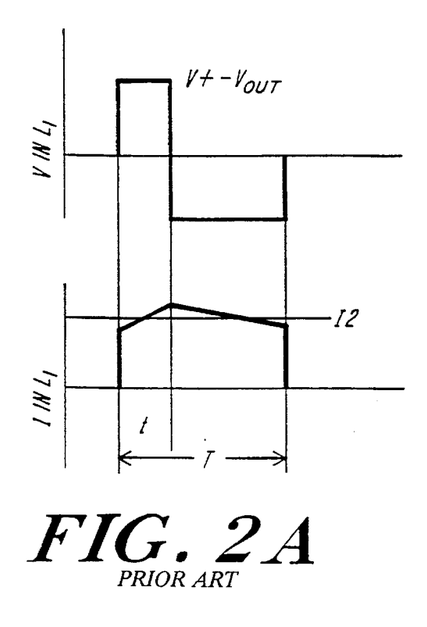
FIGS. 2A–2B are representations of voltages and currents, respectively, in the circuit of FIG. 1 during normal operations.
Figure 2B:
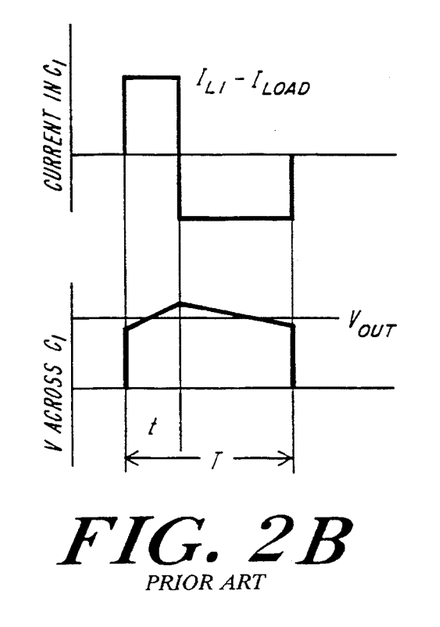

Referring to FIGS. 1 and 2, in a typical prior art switch mode power supply design, (and a simple design), a so-called non-isolated Buck converter has a DC input voltage $V_+$, a DC output voltage $V_{out}$, an active switching device illustrated as an NPN transistor, $Q_1$, a rectifying diode $D_1$, a series inductor $L_1$, a capacitor $C_1$, and a resistive load R. The output of this switching power supply is described by the equation:

$$V_{out}=(t/T)V_+=kV_+ \qquad \text{(Equation 1)}$$

where "k" is the duty cycle. The voltage and current across the inductor $L_1$ is illustrated in FIG. 2.

Figure 3:
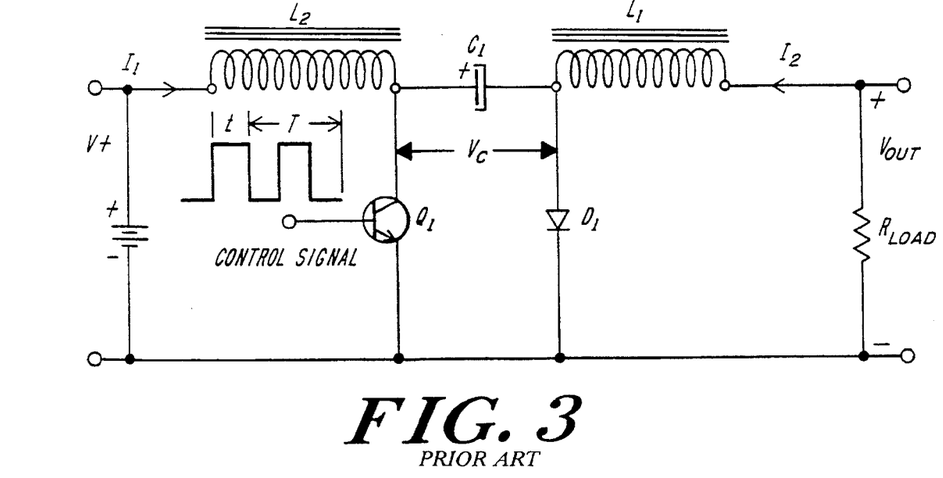
FIG. 3 is a circuit diagram of a Cuk converter.

Referring to FIG. 3, in other architectures for amplifiers, power supplies and frequency convertors, the next level of complexity comes by adding a second inductor $L_2$, and isolating the input from the output using a capacitor. This is often done when an output voltage polarity different from an input voltage polarity is required. Referring to FIG. 3, the addition of the second reactive element $L_2$ makes it possible, by isolating the input and output, to provide an output voltage having a different polarity than the input. Here, the active device $Q_1$ is operated in a shunt mode. The operation of the power supply of FIG. 3 is more complex than the power supply of FIG. 1, and is detailed in Hnatnek, "Design of Solid State Power Supplies" Third Edition, 1989, Van Nostrand Rheinhold, at pages 160 and following. The DC isolation is provided by capacitor $C_1$ and the drive to the base of the active device $Q_1$ turns the transistor hard on for a time t with a period T. When $Q_1$ turns on, a voltage $V_+$ is developed across $L_2$ and the current in $L_2$ begins to rise at a rate of $V_+/L_2$. When $Q_1$ turns off, the current $L_2$ continues to flow into $C_1$ through the rectifier $D_1$. Eventually capacitor $C_1$ charges to a constant voltage $V_c$. The equations which describe the on and off operation of the circuit are given in two pairs below. Equations 2 and 3 describe the operation when $Q_1$ is on and the equations 4 and 5 describe the operation when $Q_1$ is off.

$$V_+=L_2\, dI_1/dt \qquad \text{(Equation 2)}$$

$$V_c=L_1\, dI_2/dt+I_2R_L \qquad \text{(Equation 3)}$$

$$V_+-V_c=L_2\, dI_1/dt \qquad \text{(Equation 4)}$$

$$0=L_1\, dI_2/dt+I_2R_L \qquad \text{(Equation 5)}$$

In order to obtain reasonably ripple-free output from the circuit of FIG. 3, and the ability to obtain a negative output voltage, the values of the inductors $L_1$ and $L_2$ must be large. Thus, the circuit of FIG. 3 requires large inductors and capacitors for proper operation of the circuit where high power is to be provided. When the power supplies of FIGS. 1 and 3 are operated in a low power environment, the component values are typically kept small, the loss is tolerated, and the frequency of operation (1/T) is raised to as high a value as possible. In high power circuits, this is not usually an option without substantially increasing the component count and developing strategies for removing the heat from both the capacitors and the inductors. As a result, very high power circuits often use a multiphase strategy based on phase shifting a multiplicity of 3-phase circuits and combining them at the end without filter components. This eliminates many component constraints but does not address the problems of line noise or high frequency noise on the output due to switching transients.

Thus, as the power output of the switch mode power supply increases, one runs into severe "component constraints" as are detailed in Hnatnek, referred to above. The components of a power supply such as those described in FIGS. 1 and 3, are subject to very high electrical stress; and in particular, the components subject to the most stress are the switching transistor, the diode, and the coupling or filter capacitors.

It is therefore an object of the invention to provide circuitry, for example, rectifiers and inverters, used in a power supply circuit which can produce substantial power, on the order of greater than 100 watts and as much as, for example, 50 kilowatts or more, which is reliable, which has a substantially reduced size, which reduces stress on the components being employed, and which delivers substantially improved performance using high temperature superconductor inductors. A further object of the invention is a power supply, especially in larger sizes, which is considerably less expensive than a supply based on conventional technology.

SUMMARY OF THE INVENTION

The invention features high performance circuitry which delivers power or sinks power of typically more than 100 watts, by embedding an electrical circuit containing a superconducting inductor in a cryogenically cooled environment. The circuit includes both an inductor or transformer winding having a superconducting material and other circuit components, all connected in a selected circuit configuration. The circuit is cryogenically cooled to a temperature at which the winding(s) exhibits superconductivity. Power is provided to the circuit configuration which then operates to generate (or sink) output power. Preferably, the method further includes the step of chopping or gating the input power at a frequency in excess of 500 Hertz and of providing an output power level of greater than 50 kilowatts.

In one aspect of the invention, a high performance circuit includes at least one inductor winding composed of a high temperature superconducting material, a power supply circuit including at least one of a MOSFET, bipolar IGFET, GTO or other power device in circuit configuration with the inductor winding, a refrigeration apparatus for cryogenically cooling the supply circuit to a temperature wherein the inductor winding exhibits superconducting characteristics, and input/output connections for applying power to and taking power from the supply circuit. The power supply circuit generally provides at least 100 watts of power.

The power supply circuit may be any of a variety of circuits including DC-DC converter circuits (for example, Buck or Cuk converters), rectifiers (for example, half-bridge or full-bridge rectifiers) or inverters. The circuits may be single phase or polyphase power supply circuits. The input output means may include electrical bus interconnections fabricated from high temperature superconductor.

In other aspects, the high performance circuit is a frequency converter or a motor speed controller circuit including, for example, those having a rectifier and inverter in an AC-DC-AC interconnection.

In another aspect of the invention, a high performance circuit includes a plurality of circuit elements in a circuit configuration including at least one inductor winding composed of a high temperature superconductivity material, input/output means for supplying power to the circuit and receiving power from the circuit, the input output/means including at least one contacting switch for connecting/disconnecting power from a source and/or load, and refrigeration means for cryogenically cooling the contacting switch and the inductor winding to a temperature wherein the inductor winding exhibits superconducting characteristics.

In preferred embodiments, the invention may include one or more of the following features. The contacting switch may be either an AC or DC contacting switch. The circuit elements includes at least one of a MOSFET, bipolar IGFET, GTO or other power device in circuit configuration with the inductor winding and may be interconnected by an electrical bus comprised of high temperature superconductor.

The high performance circuits may be used to build switch mode amplifiers, regulated power supplies, phase shifters, gyrators, or motor starter controllers. Depending on the constraints of the design, one, many, or all of the components can be operated at reduced temperatures.

Other objects, features, and advantages of the invention will be apparent from the following description taken together with the drawings in which:

DESCRIPTION OF THE PREFERRED EMBODIMENTS

Figure 4:
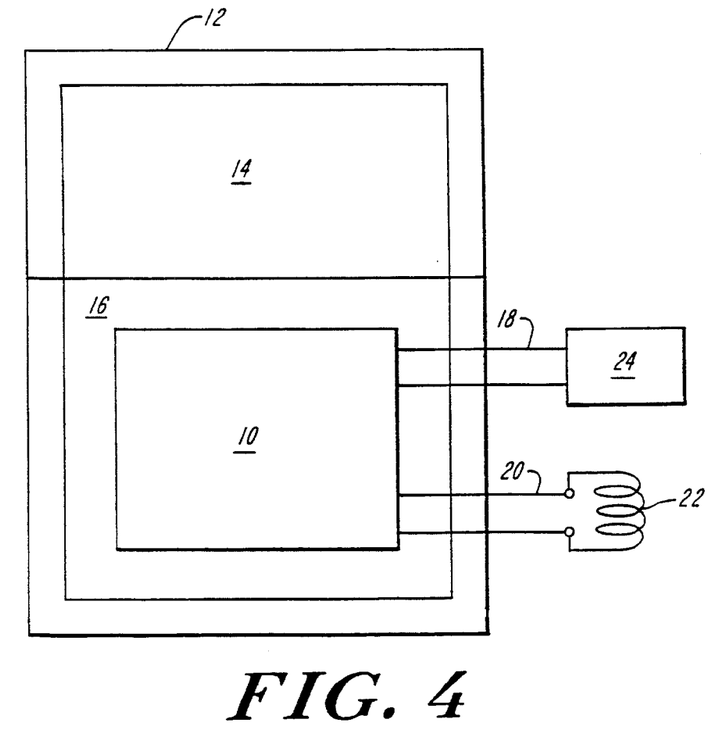
FIG. 4 is a schematic representation of a circuit configuration in accordance with a preferred embodiment of the invention.

In accordance with the invention, referring to FIG. 4, a high performance electronic circuitry 10 is cryogenically cooled in a refrigeration device 12. The refrigeration equipment is provided in section 14 of the refrigeration device and the circuitry 10 is contained in a refrigeration compartment 16. Connections for interfacing power to the circuitry 10 are provided over lines 18 and connections for receiving or sinking power from or to the circuitry are provided over lines 20 which are connected to a load 22. A power source 24, connected to lines 18, can be, for example, a DC or AC power source depending upon the circuit configuration and function of circuitry 10.

The advantages of cryogenically cooling circuitry 10 entirely are not obvious to one practiced in the art. In particular, to cryogenically cool an entire circuit requires substantial refrigeration capacity and the cost of that refrigeration capacity, the refrigeration penalty, must be overcome. Thus, from an efficiency point of view, there must be a good reason to pay the refrigeration penalty in the design of such a power generating system. However, "reason" for justifying the expense for amplifiers, motor controllers, and power supplies whose output power exceeds 50 kilowatts is clear, if it is assumed that the refrigerator is operating at 77° K. and has an overall thermal efficiency greater than or about 2.4%. For a typical commercially available cryocooler (for example, Model No. UCH150, Balzers U.S., Hudson N.H.), 6.5 kilowatts of input power produces 150 watts of cooling at 77° K. at about 2.4% overall efficiency.

For a typical 50 kilowatt switching power supply, operating at 85% overall efficiency at room temperature, the power dissipation may be 8.8 kilowatts. If one were able to improve the efficiency to 99.7%, due to cryogenic cooling of all of the components of the power supply and the provision of high temperature superconducting inductors, then only 150 watts of heat would need to be removed through the refrigeration system. Assuming a 2.4% efficient refrigeration system, this would require an input refrigeration power of 6.5 kilowatts which represents a net savings of 2.3 KW, from solely an energy viewpoint.

Instead of cooling all of the circuitry, one may decide to cool only some of the components such as the superconducting inductors and filter capacitors. An example of this would be a 600 Volt, 15A, 9 KW power supply operating at 13 KHz with 350 watts of loss, most of it in the switching losses of the devices. A. W. Green and J. T. Boys teach that the switching losses in the active devices dominate the design; and these losses increase linearly with frequency. If the designer wished to minimize cost with a ten times scale up in output power, of the design, at the same voltage, one might consider reducing the frequency of operation by a factor of ten, keeping the power dissipation rating of the devices approximately the same and scaling up the size of the filter components so that $L_{NEW} C_{NEW}$ equals approximately 100 $L_{OLD} C_{OLD}$.

If conventional technology were used, this would not be an appropriate approach. Consider the following two extremes. The original design used $L_{OLD}$ equal to approximately 10 mH and $C_{OLD}$ equal to approximately 2 mF. Both the inductor and filter capacitor must have low losses when subject to high AC currents at the operating frequency, and harmonics thereof. Therefore, high cost oil or other low loss filter capacitors may be needed. For example, if oil filled, 50 microfarad, 1 KV capacitors are used, 40 would be required in the original design. If the inductor is kept the same, then 100 times as many capacitors are required. This is an impractical number. Conversely, if the capacitor value is kept the same, then the inductor must scale to one hundred times its original value. A 1H copper and ferrite or air core choke operating with 150 Amps of current flow, weighs several tons. However, the high temperature superconductor equivalent inductor weighs approximately 30 kg. If a 100 kg, 2 KW input power refrigerator is added, the weight, cost savings, and energy savings are substantial.

Just as important, however, as the energy balance and related cost consideration, is the ability to control size (volume) in power supplies such as those having an output power greater than 50 kilowatts. In practice, this has been very difficult to accomplish since the size of the components, in particular the inductive components, tends to grow in volume, at least linearly, in proportion to the output power. As a result, the ability to substitute an inductive coil having superconducting characteristics for the typical copper based coil provides significant advantages. Further, as is well described in the literature, with regard to individual electronic components, other significant advantages have been noted in other circuit components by operating them in a cryogenic environment.

Considering, in particular, the inductors used in a switching power supply, it is known that to ensure continuous current in inductor $L_2$ (in FIG. 3) there must be a certain minimum size to ensure stable operation with good regulation. The output current $I_2$, in particular, must be larger than half of the AC current flowing in inductor $L_2$ and this can be accomplished by making the value of $L_2$ satisfy the equation:

$$L_2 > (\tfrac{1}{2} f_{min}) (V_{out}/I_{2min}) (1 - K_{max} (V_{+min}/V_{+max})) \qquad \text{(Equation 6)}$$

In this equation $f_{min}$ is the minimum operating frequency for the converter. Thus, high voltage, low frequency power supplies require the largest inductors to operate correctly, and since $L_2$ has a DC current in, for example, the application of FIG. 3, an air gap is required in a copper based design having a magnetic core.

Further, a major constraint on the core is to limit the temperature rise in it because of the relatively low Curie temperature, about 200° C., which limits the maximum operating temperature of the core to about 100° C. While modern insulation technology allows the transformer or inductor winding to operate at higher temperatures, the ferrite cores, or their lower loss equivalents, cannot operate at the temperatures compatible with the insulation. Thus, the larger the inductor, the larger the problem since the volumetric heat generation is a constant while the surface area of the inductor, from which the heat is rejected, does not scale linearly with the volume. Thus core losses generally limit current densities in the winding to less than the 200 amperes per square centimeter, and may force air core designs or special forced cooling in larger systems.

Further, with regard to the use of capacitors in the circuitry 10, the AC component of the output must flow through the capacitor in, for example, the circuit of FIG. 3. This current increases with frequency since for a capacitor:

$$i = C \, dv/dt \qquad \text{(Equation 7)}$$

Since capacitors are not lossless when current flows through them, they suffer from high power dissipation. This is in addition to the leakage losses. There is also a peak current limitation for capacitors. Therefore, the advantages of using cryocooled, low-loss, high-current, capacitors, is substantial.

Accordingly, therefore, referring to the converter of FIG. 3 as a typical example, substantial advantages can be obtained by cryogenically cooling the entire power supply circuit. By making the inductor windings of materials which exhibit superconducting characteristics at 77° K., by making the capacitor of a specially formulated cryogenic, low loss, dielectric material, and by obtaining the advantages of cryogenically cooled MOSFET's and diodes, there can result the following substantial advantages. First, cooling the MOSFET provides for a faster operating device (because of the higher mobility within the semiconductor, and possibly, in a redesigned device, the ability to operate at higher voltages (because of the control of parasitic voltages and freezeout of the breakdown mechanism), the ability to operate at higher current densities in part because the mobility is higher and current flow is more uniform, and because a lower voltage can be placed across the MOSFET junction. The active devices may also operate with better performance under fault conditions since $I^2t$ is enhanced at low temperatures.

Similar advantages result when a cryogenic capacitor is used. In particular, a cryogenically cooled capacitor provides for greater voltage breakdown ratings, smaller AC loss, and greater energy density. Moreover, the probability of thermally induced failure decreases markedly in cryogenic capacitors due to the low temperature, hence, operating lifetime of the dielectric is prolonged.

The inductor containing devices, which can also be transformers, need not operate at as high a frequency when superconducting materials are used. Typically, in a high output power supply, in which a DC voltage input is converted to a DC output (as in the circuit configuration of FIG. 3), a relatively small storage inductor and a very high speed, pulse width modulated switch is used to produce a pulsed DC. A high frequency filter then provides a variable amplitude DC, the amplitude depending upon the switching pattern. While the high frequencies reduce the energy stored in and the size of the coil, there is difficulty in providing high frequency, high power switching devices. Further, the heat dissipation due to the high frequency dielectric losses in the capacitor and required high currents is substantial. Using a coil containing device where the winding is a superconducting material thus has the advantage of allowing a lower modulation frequency to be used while keeping the coil sufficiently small since it does not have the concomitant difficulties of a copper based inductor. In particular, for example, a copper based coil has a skin effect so that the penetration depth is inversely proportional to the square root of frequency. Thus, a wire cannot be made small enough, when operating in the 600 KHz range, to fully utilize the entire volume of the wire. The superconducting inductor can thus be used to allow the power supply to operate at a lower frequency while providing power. The substantially sole issue is how to get the thermal dissipated power out of the power supply and, as noted above, this can be achieved, economically, for power supplies above about 50 kilowatts by using the already available cooling or refrigeration system. For lower output power supplies, the economics based from a solely energy point-of-view are not strong, however, the smaller size which can be obtained is significant.

Figures 5, 6, 7:
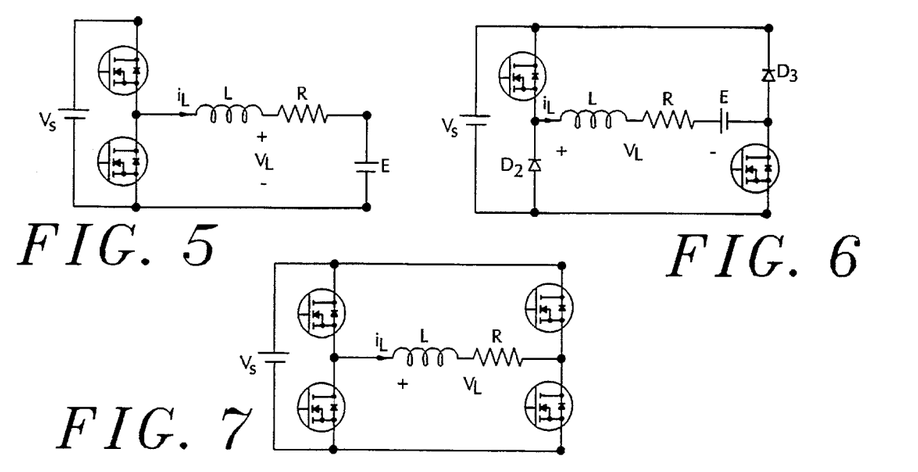
FIG. 5 is a circuit diagram of a half-bridge rectifier circuit.
FIG. 6 is a circuit diagram of an alternate version of a half-bridge rectifier circuit.
FIG. 7 is a circuit diagram of a full-bridge rectifier circuit.

The circuits of FIGS. 1 and 3 represent basic single quadrant chopper circuits which are limited to only allowing power to flow from the supply to the load. Such choppers can be combined to form a half-bridge (two-quadrant chopper), such as those shown in FIGS. 5 and 6. In a half-bridge the load current is either positive or negative and the circuit may be operated either as single phase rectifiers or inverters. Referring to FIG. 7, combining a pair of two-quadrant choppers (for example, as shown in FIG. 5) can provide a four-quadrant chopper which can serve as the basis for a single-phase full-bridge inverter. The operation of the power supply circuits of FIGS. 5–7 are detailed in M. H. Rashid, "Power Electronics Circuits, Devices and Applications," 2nd Edition, 1993, Prentice Hall, at pages 303–316 and 356–361. These circuits can also be cryocooled to achieve substantial operating advantages.

The concept of cryogenically cooling the entire circuit configuration is also applicable in polyphase applications, particularly high power polyphase switching conversion circuits.

Polyphase power systems are more attractive in high power applications (e.g., utility, adjustable speed motor drives) than single phase systems for a number of reasons. For example, unlike single-phase power, the instantaneous power of three phase (or any balanced polyphase system) is constant. Moreover, the output voltage of a polyphase rectifier is smoother than that of single-phase rectifiers when no filter is used with either. The utilization of transformers and other associated equipment is also improved in polyphase circuits over those with single-phase circuits, and generally results in improved power factor and reduced harmonic distortion.

However, the improved performance of polyphase systems comes at the price of increased complexity. With polyphase rectification, for example, the commutation intervals are considerably more complex and cannot be solely determined on the basis of polarity of the input voltage. Instead, the rectifier commutation points occur at intervals determined by the transitions at which a particular phase voltage becomes most positive or most negative with respect to the other input phases. The complexity increases when considering, for example, 48 pulse (24 phase) rectification which is commonly employed to reduce output ripple in the rectified DC voltage.

Figure 8:
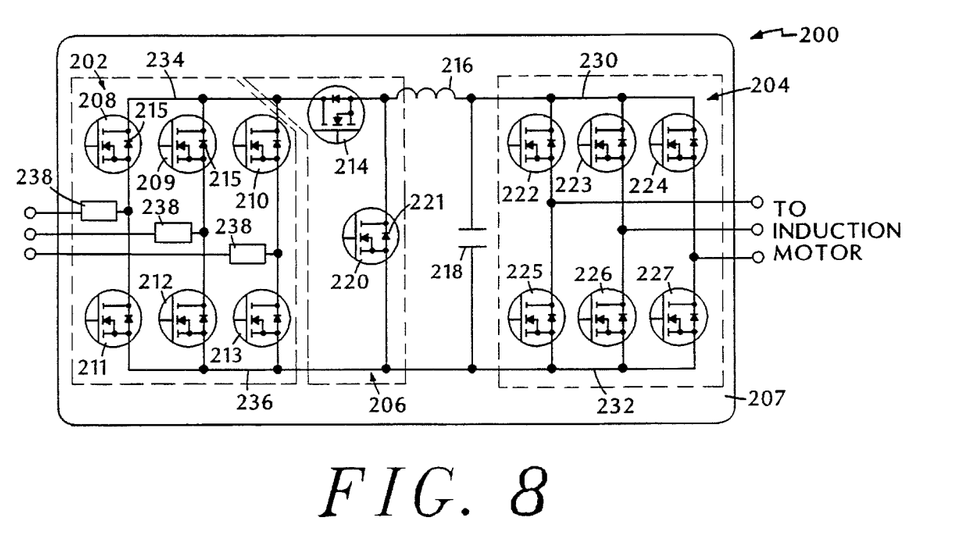
FIG. 8 is a schematic diagram of a cryogenic conversion module in accordance with the present invention.

For example, referring to FIG. 8, a cryogenic power conversion module 200 includes a three-phase AC/DC rectifier 202, which may be a synchronous rectifier, coupled to a three-phase inverter 204 through a DC chopper circuit 206. Three-phase AC power provided to module 200 is rectified to a DC signal and then stepped down through DC chopper 206 and filtered before being reconverted back to an AC signal with a desired voltage ($V_2$), current ($I_2$), frequency ($F_2$, e.g., 60 Hz), and phase characteristic ($\phi_2$). Rectifier 202, inverter 204, and DC chopper 206 are all cooled to a temperature of less than 120° K., and preferably about 77° K., using a cryogenic refrigeration unit 207. Power module 200 is particularly suitable for use in adjustable speed drives (ASDs) or applications where the AC source supply has a variable amplitude and/or frequency characteristic.

Rectifier circuit 202 receives three AC waveforms of approximately 120 volts each from, for example, the secondary of a transformer. The voltages have a differential phase of 120° from each other with the interphase voltage being 208 volts. Rectification of the AC signals is provided using six MOSFET switching devices 208–213 configured in a "full-wave" commutation switching arrangement with each MOSFET device conducting for ⅓ of the full wave cycle (i.e., 120 degrees). In high power applications, each MOSFET switching device 208–213 may represent a number of individual MOSFET devices connected in parallel. An integrated circuit driver (not shown), for example, Model No. IR2130, International Rectifier Corp., El Segundo, Calif. serves as a voltage and current buffer between a control circuit and the individual MOSFETs 208–213, and also generates the drive signals, provided to the gate electrodes of the MOSFETs, necessary to switch the MOSFETs between on and off states. MOSFETS 208–213 conduct in pairs for six distinct time intervals of commutation so as to provide to DC chopper circuit 206 an output voltage waveform approximating a DC output level of 300 volts at 200 amps continuous, yielding a total output power of 60 kilowatts. The switching intervals and generation of the resultant output voltage waveform from rectifier 202 as well as a well-suited galvanically isolated control circuit for generating control signals for rectifier 202 are detailed in application Ser. No. 08/288,080, assigned to the owner of the present invention and hereby incorporated by reference.

MOSFETs 208–213 are, for example, commercially available high voltage (600 V) n-channel MOSFETs (Model No. ATP6030BN, available from Advanced Power Technology, Bend, OR) having a maximum current rating of 23A. It has been observed that certain MOSFET devices exhibit significantly improved thermal and electrical properties when operated at cryogenic temperatures (See U.S. Pat. No. 5,126,830, Mueller et al). For example, the thermal conductivity of semiconductor materials (e.g., silicon, germanium, and GaAs) can increase by factors of from 5–10 times when cooled to a temperature of 77° K. (This phenomena has also been observed with certain substrate materials, for example, beryllium oxide). As a result, the internal junction temperatures of the MOSFET devices are significantly reduced. Moreover, MOSFETs having low-doped silicon drain-drift regions (such as the Model APT6030BN device) have significantly increased electron and hole mobilities at cryogenic temperatures. Thus, the on-resistance (i.e, the drain to source resistance) of such high voltage MOSFETs decreases by a factor from 10–30 in the rated current range. MOSFETs also have the important characteristic of not having an intrinsic drain-source on-state threshold voltage. The on-resistance and voltage drop across the MOSFET can, therefore, be made arbitrarily small by using a number of MOSFET devices connected in parallel.

Each MOSFET device 208–213 includes a built-in drain-source diode 215 provided intrinsically in the fabrication of the MOSFET device. In the cooled condition, the MOSFET device with intrinsic drain source diode behaves like a FREDFET™ (fast recovery epitaxial diode FET) and provides an important advantage in the operation of synchronous rectifier 202 or inverter 204 (FIG. 7). Commercially available high current, high voltage rectifier diodes are notoriously slow. For example, a 400 V, 1600A device typically exhibits a recovery time of five microseconds compared with a typical 20 nanosecond fast recovery device available for low current signals. In the event that one or more of MOSFET devices 208–213 fails to switch (due to problems with the driver, its control circuit or the MOSFET itself) diode 215 provides rectification of the AC current passing through the device. In effect, diode 215 serves as a "back up" rectifier for the switching MOSFET, albeit, with a higher loss. A diode serving this purpose is generally required to be added externally for other types of devices (for example, IGBTs, GTOs, thyristor diodes) used in high power rectifier circuits.

Cryogenically cooling the MOSFET devices dramatically reduces the reverse recovery time of drain source diode 215, and as noted below, provides other substantial benefits. It is important to note that in synchronous rectification the intrinsic diode of the MOSFET is not used and plays no direct role in the operation of the MOSFET. It is generally desired that the built-in drain-source diode 215 never be used because of its slow switching speed, particularly in a 300° K. operating device. However, if the MOSFET fails to switch, when cooled to 77° K., the slow switching of the intrinsic diodes is increased due to the increase in its carrier mobility as a result of cooling. Operating the MOSFET at cryogenic temperatures helps to insure that in normal operation the intrinsic diode does not conduct. This is because the forward voltage of the intrinsic drain source diode at 77° K. is greater than the forward voltage exhibited at 25° C. An additional benefit of cryogenic operation of the MOSFET is an effective extension of the safe operating area (SOA) characteristic of the device due to the reduction of power dissipation in the MOSFET at a specified drain current achieved by cooling the device. High pulse power throughput can be sustained by the cooled MOSFET without reaching those junction temperatures which may result in damaging the device.

The DC approximated waveform generated by rectifier 202 is received by DC chopper circuit 206 which is configured to have a half-bridge topology, similar to that shown in FIG. 5, and which operates as a Buck Regulator (FIG. 1). Chopper circuit 206 steps-down the fixed voltage DC output of 300 volts from rectifier 202 to a lower but variable DC voltage, an advantage in certain motor drive applications as will be described below. The operation of chopper 206 can be divided into two modes. Mode 1 begins when a switching transistor 214 (shown as a MOSFET) of the chopper circuit is switched on, with a switching transistor 220 (also shown as a MOSFET) switched off. In mode 1, the input current rises and flows through a filter coil 216, a filter capacitor 218 and three-phase inverter 204. Mode 2 begins when transistor 214 is switched off, and following a short delay time, transistor 220 is switched on to allow current to continue to flow through coil 216, capacitor 218, and inverter 204. It is important that the delay time be minimized to prevent excessive power dissipation in the intrinsic diode 221 of transistor 220. The current through coil 216 falls until transistor 214 is switched on again in the next cycle. Before returning to mode 1, another short delay is required after transistor 220 is switched off and transistor 214 is switched back on. Generally, the switching frequency is desired to be as high as possible, for example, greater than 10 KHz, to reduce the load ripple current and to minimize the size of the coil in the load circuit.

Because transistors 214, 220 in DC chopper circuit 206 are MOSFET devices, many of the advantages previously described above in conjunction with MOSFETs 201–213 are applicable in this circuit as well when it is cryogenically cooled. Particularly, these devices, when cooled, provide reduced power dissipation, as compared to the losses normally incurred with the use of a conventional freewheeling diode during mode 2. Moreover, the reverse recovery time of the intrinsic diode 221 is reduced due to cooling, thus, resulting in reduced turn-on losses in transistor 214 at the onset of mode 1.

In order to reduce the relatively large $I^2R$ losses and the IR voltage drop in its windings, coil 216 is fabricated from a high temperature superconducting material and cryogenically cooled. Similarly, capacitor 218 may also be a cryogenic capacitor.

Three-phase inverter 204 is coupled to chopper 206 and serves to change the DC link of 300 volts to a 3-phase 208 volt, 60 Hz AC output which may be provided, for example, to an adjustable speed motor drive. Inverter 204 has a topology generally the same as that of the rectifier 202 including paralleled groups of MOSFETs 222–227 operated at cryogenic temperatures, for example, 77° K. As was the case with the MOSFETs of the three-phase rectifier 202 each MOSFET 222–227 includes an intrinsic diode acting as a fast recovery surrogate for the external diode required when IGBT devices are used. Pulse-width-modulation (PWM) control signals are generated by, for example, a driver circuit, like the one used for generating drive signals for three-phase rectifier 202 in response to a phase locked oscillator. Alternatively, a microcontroller programmed to provide the necessary switching sequence of MOSFETs 222–227 may be used to provide low level control signals to drive MOSFETs 222–227.

The ability of DC chopper circuit 206 to adjust the DC output from rectifier 202 is an important feature of the cryogenic conversion module 200, particularly in high horsepower induction motor drive applications. In such applications, if the motor is desired to be operated at a speed below its full rating and the DC voltage applied to inverter 204 is fixed, both the AC output frequency of inverter 204 and the AC output voltage amplitude must be simultaneously lowered with the ratio of the voltage and frequency being maintained constant. This operation is commonly referred to as volts/hertz control. Modulating the amplitude in this way, however, has severe drawbacks. First, the frequency has to be varied over a relatively broad range to vary the speed appreciatively. Furthermore, as the speed of the motor decreases, the duty cycle of the pulse-width-modulation must likewise decrease making it increasingly difficult to maintain a smooth sinusoidal output from the inverter due to generation of harmonics. Increased filtering generally is required to reduce the harmonic output. Adjusting the DC voltage level, however, allows the amplitude of voltage waveform to be modulated with the pulse width modulation index kept constant thereby preserving low harmonic distortion and effectiveness of the filters.

Another significant advantage of the cryogenic power conversion module 200 is its ability to be operated in reverse. Once again, because inverter 204 has a four quadrant topology, it is capable of not only generating three phase AC power, as described above, but can receive, for example, regenerative power from the motor and return it to the DC link and/or the AC source. This feature provides significant energy savings, for example, in transportation systems where braking of a high horsepower motor in an electric train regenerates power. As is well known in the art, recovering the energy in this way, is preferable to dissipating the energy as waste heat which is particularly undesirable in a cryogenic environment.

Referring again to FIG. 8, in applications where particularly high levels of current are conveyed between a source and load, electrical bus interconnections within the cryogenic power module 200 may be fabricated utilizing HTS conductor, thereby minimizing internal $I^2R$ losses and IR drops. For example, busses 230, 232 which connect the drain and source electrodes, respectively, of MOSFETs 222–227, if fabricated from HTS conductor, can appreciably reduce the internal loss within module 200. Similarly, busses 234, 236 of rectifier 202 may also be fabricated from HTS conductor.

In a presently preferred embodiment, solid-state electronic contactors 238 (shown as boxes in FIG. 8) for disconnecting and connecting power from the source and/or load are implemented using cryogenically cooled semiconductor switching devices 240, 242, (e.g., MOSFETs). The solid-state contactors minimize losses and improve the overall reliability of the system in which the cryogenic module 220 is used. Contactors 238 replace electrical/mechanical relays and switches which are generally used to shut the system off, for example, to provide maintenance and service to the system. The contacts of such electrical/mechanical devices, due to the mechanical movement of parts, over time, begin to wear causing the ohmic resistance and, thus, the temperature of the contact to increase. Eventually, arcing across the contact points may occur. Replacing the electrical/mechanical devices with cryogenically-cooled solid-state contactors dramatically increases the reliability of the module and provides more accurate control, if, for example, current is applied gradually or in stepped fashion.

Figure 9:
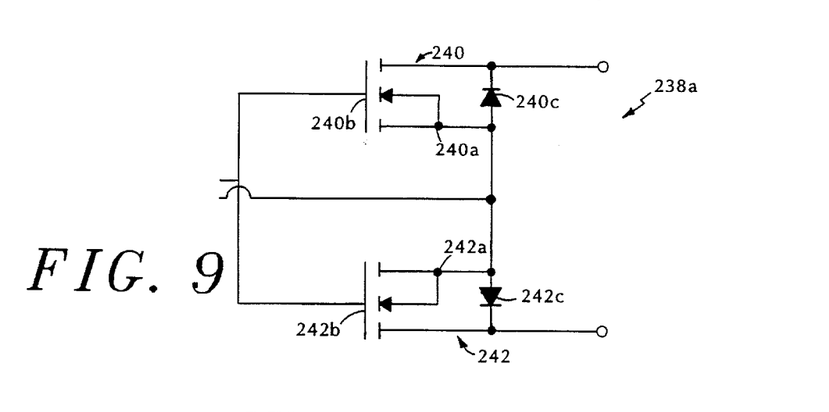
FIG. 9 is a schematic diagram of an AC contacting switch.

Referring to FIG. 9, an exemplary solid-state AC contactor 238*a* includes a pair of MOSFET switching devices 240, 242 having their respective source 240*a*, 242*a* and gate electrodes 240*b*, 242*b* coupled together. Increasing the gate to source voltage ($V_{gs}$) at the gate electrodes turns the switch on allowing current to pass through the contactor. In fact, the electrical performance of contactor 238*a* is significantly enhanced at cryogenic temperatures due to the reduced on-resistance of the MOSFET devices. For example, at room temperature, during each half cycle of the AC signal, one MOSFET conducts with some current flowing through the intrinsic diode of the other MOSFET due to its relatively lower forward drop voltage. On the other hand, at cryogenic temperatures, the forward voltage of the intrinsic diodes 240*c*, 242*c*, associated with each MOSFET 240, 242, is greater than the voltage drop across the associated MOSFET due to the drop in on-resistance of the MOSFET at the lower temperature.

Figure 10:
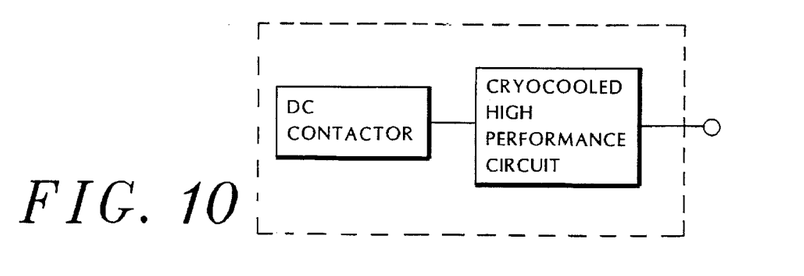
FIG. 10 is a block diagram of a cryogenically cooled DC contacting switch used in conjunction with a high performance circuit.

Referring to FIG. 10, a cryogenically- cooled solid-state DC contactor 250 may also be used between a DC source and a high performance circuit 252 ( e.g., power converters, rectifiers, inverters), described above. The use of a solid state DC contactor as a replacement for a mechanical switch is particularly advantageous because, unlike switching an AC signal, there is no zero crossing which can be sensed to reduce switching loss in more complex circuitry.

It is appreciated that any number of commercially available MOSFET or static induction transistors (SITs) may be substituted for MOSFETs 208–213 as described above depending on the application and power levels involved. However, IGBTs, GTOs, thyristors are unable to take advantage of this feature because of their intrinsic on-state voltage drop characteristics, and their unidirectional conduction characteristics.

Cryogenic power conversion module 200 is cooled within a dewar filled with liquid nitrogen. Although liquid nitrogen is the preferred cryogen, for economic reasons, any cryogenic fluid or mechanical cryo-refrigerator can be used. Rectifier 202, inverter 204, chopper 206, as well as associated driver and control circuits are all immersed within the liquid nitrogen. Components non-operational at cryogenic temperatures, for example, a microcontroller for inverter 204, if used, would be positioned external to the dewar. Generally, the power conversion electronics require a relatively small amount of additional space over that required for the large superconducting inductor windings used as a DC link and/or filter. The coupling medium can be conduction cooling or gas cooling. Additionally, the cryocooler may be used as a refluxer for a liquid cryogen.

Other embodiments are within the scope of the claims. For example, cryogenic cooling of the circuits and components described above may be accomplished using any of a variety of active refrigeration units or passive cooling baths and, where necessary, may use any of a variety of cooling liquids, in addition to liquid nitrogen as described above. Other embodiments may use liquid cryogens at temperatures other than 77° K. or utilize a multi-stage refrigerator wherein the superconducting components and silicon components (e.g., MOSFETs) are cooled at different temperatures.

Accordingly, there is described a method and apparatus for providing high performance circuitry by cryogenically cooling the entire circuit configuration. The refrigeration penalty which must be paid is balanced in high power devices by the reduction in power dissipated by the same circuitry at room temperature, and in the case of smaller output supplies, is balanced by the ability to provide smaller size components. The invention enables the generation of higher power in such applications as battery chargers, welding power supplies, electrochemical processing power supplies, induction furnace supplies, switching and other types of power supplies, power amplifiers, gyrators, frequency converters, and motor starters and controllers. In particular, note that the power amplifier can be used at frequencies up to and including one megahertz which was previously unavailable for the reasons noted previously. In addition, in other applications, the AC source voltage, DC link voltage, and inverter output voltage may be larger in magnitude (e.g., 480 volts, 3 phase input, 650 volts DC link, and 480 volts AC output), the ratings of the cryocooled MOSFETs and other component being selected accordingly.

In a typical inductor coil, one can use BSCCO as the superconducting material as has been well described and documented in the art. A typical paper describing the superconducting characteristics of BSCCO at 77 K. is: Malozemoff - Kiev conference, Applied Superconductivity Conference. Similarly, in cryogenic capacitors, $A_2B_2O_7$ dielectrics may be tailored to have a peak dielectric constant at low temperatures. William Lawless and C. Fred Clark of Ceramphysics, for example, describe the advantages and measurements, based on the use of Cpn-17 as cryogenic dielectric material, for a high energy density, pulse-mode capacitor. Other dielectrics exhibiting stable and enhanced electrical performance at cryogenic temperatures used in the fabrication of capacitors include polypropylene, polyester (e.g., mylar™), and polyimide film (e.g., Kapton®, E. I. Dupont de Nemours, Wilmington, Del.).

Additions, subtractions, deletions and other modifications of the described embodiment will be apparent to those practiced in the field, and are within the scope of the following claims.

What is claimed is:

1. A high performance circuit comprising:
    at least one inductor winding composed of a high temperature superconductivity material and,
    a power supply circuit including at least one of a MOSFET, bipolar IGFET, GTO or other power device in circuit configuration with said inductor winding, wherein the power supply circuit is a rectifier circuit for converting alternating current into direct current and providing the direct current to a load,
    refrigeration means for cryogenically cooling at least the superconducting element of the supply circuit to a temperature wherein said inductor winding exhibits superconducting characteristics, and
    input/output means for supplying power to said circuit and receiving power from said circuit,
    said circuit providing at least one hundred watts of power to said load.

2. The high performance circuit of claim 1 wherein the rectifier circuit is a half-bridge rectifier.

3. The high performance circuit power supply circuit of claim 1 wherein the rectifier is a full-bridge rectifier.

4. The high performance circuit of claim 1 wherein the rectifier is a polyphase switching rectifier including a plurality of switching devices and said power source applies to the polyphase switching rectifier a plurality of alternating current input signals having a differential phase shift relationship with respect to each other.

5. The high performance circuit of claim 4 wherein the differential phase shift between the plurality of alternating current input signals is 120°.

6. The high performance circuit of claim 1 wherein the cryogenic cooling system cools the power supply circuit.

7. The high performance circuit of claim 1 wherein said power supply circuit is an inverter circuit for converting direct current into alternating current and providing the alternating current to a load.

8. The high performance circuit of claim 7 wherein the inverter is a polyphase switching inverter including a plurality of switching devices controlled to generate polyphase AC output signals from a DC link voltage, said AC output signals having a differential phase shift relationship with respect to each other.

9. The high performance circuit of claim 8 further comprising:
    a DC chopper; and
    a filter circuit for generating from a DC chopper output said DC link voltage, the DC link voltage provided to the input of the polyphase switching inverter.

10. The high performance circuit of claim 9 further comprising a polyphase bridge rectifier coupled to the input of the DC chopper.

11. The high performance circuit of claim 10 wherein the differential phase shift between the plurality of alternating current input signals is 120°.

12. The high performance circuit of claim 9 wherein the cryogenic cooling system cools the inverter circuit, DC chopper, filter circuit and polyphase bridge rectifier.

13. The high performance circuit of claim 1 wherein said power supply circuit and/or said input output means include electrical bus interconnections comprising high temperature superconductor.

14. A high performance circuit comprising:
    at least one inductor winding composed of a high temperature superconductivity material and,
    a frequency converter including at least one of a MOSFET, bipolar IGFET, GTO or other power device in circuit configuration with said inductor winding,
    refrigeration means for cryogenically cooling at least the superconducting element of the circuit to a temperature wherein said inductor winding exhibits superconducting characteristics, and
    input/output means for supplying power to said circuit and receiving power from said circuit,
    said circuit providing at least one hundred watts of power to a load.

15. The high performance circuit of claim 14 wherein said frequency converter and/or said input output means include electrical bus interconnections comprising high temperature superconductor.

16. A high performance circuit comprising:
    at least one inductor winding composed of a high temperature superconductivity material and,
    a motor speed controller including at least one of a MOSFET, bipolar IGFET, GTO or other power device in circuit configuration with said inductor winding,
    refrigeration means for cryogenically cooling at least the superconducting element of the supply circuit to a temperature wherein said inductor winding exhibits superconducting characteristics, and
    input/output means for supplying power to said circuit and receiving power from said circuit,
    said circuit providing at least one hundred watts of power to a load.

17. A high performance circuit comprising:

a plurality of circuit elements in a circuit configuration, said circuit elements including at least one inductor winding composed of a high temperature superconductivity material, input/output means for supplying power to said circuit and receiving power from said circuit, said input output/means comprising at least one contacting switch for connecting/disconnecting power from a source and/or load, and refrigeration means for cryogenically cooling said at least one contacting switch and said at least one inductor winding to a temperature wherein said inductor winding exhibits superconducting characteristics.

18. The high performance circuit of claim 17 wherein said contacting switch connects/disconnects AC power from a source and/or load.

19. The high performance circuit of claim 17 wherein said contacting switch connects/disconnects DC power from a source and/or load.

20. The high performance circuit of claim 17 wherein said plurality of circuit elements includes at least one of a MOSFET, bipolar IGFET, GTO or other power device in circuit configuration with said inductor winding.

21. The high performance circuit of claim 17 further comprising electrical bus interconnections formed of high temperatures superconductor between at least a pair of said plurality of circuit elements.

* * * * *